United States Patent
Wang et al.

(10) Patent No.: US 12,183,370 B2
(45) Date of Patent: Dec. 31, 2024

(54) VIDEO GENERATION METHOD AND APPARATUS, DEVICE, AND STORAGE MEDIUM

(71) Applicant: BEIJING ZITIAO NETWORK TECHNOLOGY CO., LTD., Beijing (CN)

(72) Inventors: Junqiang Wang, Beijing (CN); Ziyang Zheng, Beijing (CN); Weihong Guan, Beijing (CN); Haitao Lv, Beijing (CN); Wanling Lin, Beijing (CN); Jiali Ye, Beijing (CN); Weiwen Lin, Beijing (CN); Yang Li, Beijing (CN); Zhanchen Zhang, Beijing (CN); Yingwen Zeng, Beijing (CN); Xin Che, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/331,340

(22) Filed: Jun. 8, 2023

(65) Prior Publication Data

US 2023/0317117 A1    Oct. 5, 2023

Related U.S. Application Data

(63) Continuation of application No. PCT/CN2021/139606, filed on Dec. 20, 2021.

(30) Foreign Application Priority Data

Dec. 31, 2020   (CN) .......................... 202011626264.X

(51) Int. Cl.
*G11B 27/036* (2006.01)
*H04N 21/4788* (2011.01)

(52) U.S. Cl.
CPC ....... *G11B 27/036* (2013.01); *H04N 21/4788* (2013.01)

(58) Field of Classification Search
CPC .......................... G11B 27/036; H04N 21/4788
(Continued)

(56) References Cited

U.S. PATENT DOCUMENTS 9,998,796 B1 *   6/2018   Kedenburg, III .... H04N 21/466
10,943,371 B1 *  3/2021   Voss ................... H04N 21/8146
(Continued)

FOREIGN PATENT DOCUMENTS

CN   101207450 A   6/2008
CN   104349175 A   2/2015
(Continued)

OTHER PUBLICATIONS

International Search Report (with English translation) and Written Opinion issued in PCT/CN2021/139606, dated Mar. 2, 2022, 13 pages provided.
(Continued)

*Primary Examiner* — Thai Q Tran
*Assistant Examiner* — Stephen R Smith
(74) *Attorney, Agent, or Firm* — Fish & Richardson P.C.

(57) ABSTRACT

A video generation method includes: when a video theme configured by a user and a video production instruction are obtained, obtaining, according to the video production instruction, a user image and multiple video templates matching the video theme; embedding the user image into reserved positions of at least some of the video templates so that the user image is combined with situational materials of the video templates to generate at least one video; obtaining a video to be published from the at least one video, and publishing the video to be published to a preset video playback platform. Thus, during the process of video pro-
(Continued)

duction, at least one video can be generated at a time as long as the user image is embedded into multiple video templates, without repeatedly photographing by a user.

12 Claims, 9 Drawing Sheets

(58) Field of Classification Search
USPC .......................................... 386/378; 715/723
See application file for complete search history.

(56) References Cited

U.S. PATENT DOCUMENTS

| | | | |
|---|---|---|---|
| 11,151,794 B1* | 10/2021 | Chepizhenko | G06T 11/00 |
| 2010/0153520 A1* | 6/2010 | Daun | G11B 27/034 |
| | | | 709/218 |
| 2013/0307997 A1* | 11/2013 | O'Keefe | G06F 16/4393 |
| | | | 348/207.1 |
| 2014/0056576 A1 | 2/2014 | Miura et al. | |
| 2019/0244407 A1* | 8/2019 | Wiesel | G06V 10/255 |
| 2020/0019812 A1 | 1/2020 | Jin et al. | |
| 2020/0236297 A1 | 7/2020 | Shaburov et al. | |
| 2021/0303622 A1* | 9/2021 | Voss | G06F 16/7328 |
| 2021/0357542 A1* | 11/2021 | Bowen | G06Q 30/0621 |
| 2021/0358181 A1 | 11/2021 | Suzuki et al. | |
| 2021/0368039 A1* | 11/2021 | Voss | H04N 21/431 |
| 2021/0375016 A1* | 12/2021 | Voss | G06V 40/166 |
| 2022/0005508 A1* | 1/2022 | Huang | G11B 27/031 |
| 2022/0100351 A1* | 3/2022 | Al Majid | H04N 21/4788 |
| 2023/0144094 A1* | 5/2023 | Wu | G06F 40/186 |
| | | | 386/278 |

FOREIGN PATENT DOCUMENTS

| | | |
|---|---|---|
| CN | 108549655 A | 9/2018 |
| CN | 109769141 A | 5/2019 |
| CN | 110266971 A | 9/2019 |
| CN | 110825912 A | 2/2020 |
| CN | 111541950 A | 8/2020 |
| CN | 111935504 A | 11/2020 |
| CN | 112866798 A | 5/2021 |
| JP | 2020512759 A | 4/2020 |
| KR | 101813902 B1 | 1/2018 |
| WO | 2013118505 A1 | 8/2013 |
| WO | 2018225968 A1 | 12/2018 |
| WO | 2020090458 A1 | 5/2020 |
| WO | 2020150692 A1 | 7/2020 |

OTHER PUBLICATIONS

The extended European search issued in European Application No. 21913994.6, dated Feb. 1, 2024.

Office Action issued in Japanese Application No. 2023-535441, dated on Jul. 9, 2024, with machine translation.

* cited by examiner

VIDEO GENERATION METHOD AND APPARATUS, DEVICE, AND STORAGE MEDIUM

This application is a continuation of International Application No. PCT/CN2021/139606, filed on Dec. 20, 2021 which claims the priority to Chinese Patent Application No. 202011626264.X, titled "VIDEO GENERATION METHOD AND APPARATUS, DEVICE, AND STORAGE MEDIUM", filed on Dec. 31, 2020 with the China National Intellectual Property Administration (CNIPA), both of which are incorporated herein by reference in their entireties.

FIELD

The present disclosure relates to the technical field of video processing, in particular to a method and an apparatus for generating a video, a device and a storage medium.

BACKGROUND

Video applications according to the conventional technology may provide functions of capturing and sharing videos to the users. As the number of users who capture or share the videos by the video applications is increased, how to improve the quality of videos captured by the users, simplify capture operations of the users, and increase the interest in the shooting videos is a problem to be solved urgently.

SUMMARY

In order to solve or at least partially solve the above technical problem, a method and an apparatus for generating a video, a device and a storage medium are provided according to embodiments of the present disclosure.

In a first aspect, a method for generating a video is provided according to an embodiment of the present disclosure. The method includes:
acquiring a video theme configured by a user and a video production instruction; acquiring a user image and multiple video templates matching the video theme, in response to the video production instruction, where each of the multiple video templates includes a preset scenario material and a reserved position for the user image; embedding the user image into the reserved position of at least a part of video template among the multiple video templates, to combine the user image with the scenario material on the at least part of video template to generate at least one video; acquiring a to-be-posted video among the at least one video; and posting the to-be-posted video to a preset video playing platform.

In a second aspect, an apparatus for generating a video is provided according to an embodiment of the present disclosure. The apparatus includes: a first acquiring module, a second acquiring module, a video generating module, a third acquiring module and a posting module.

The first acquiring module is configured to acquire a video theme configured by a user and a video production instruction.

The second acquiring module is configured to acquire a user image and multiple video templates matching the video theme, in response to the video production instruction, where each of the multiple video templates includes a preset scenario material and a reserved position for the user image.

The video generating module is configured to embed the user image into the reserved position of at least a part of video template among the multiple video templates, to combine the user image with the scenario material on the at least part of video template to generate at least one video.

The third acquiring module is configured to acquire a to-be-posted video among the at least one video.

The posting module is configured to post the to-be-posted video to a preset video playing platform.

In a third aspect, a terminal device is provided according to an embodiment of the present disclosure. The terminal device includes a memory and a processor, where the memory stores a computer program. The computer program, when executed by the processor, causes the processor to implement the method according to the first aspect described above.

In a fourth aspect, a computer-readable storage medium is provided according to an embodiment of the present disclosure. The computer-readable storage medium stores a computer program. The computer program, when executed by a processor, causes the processor to implement the method according to the first aspect described above.

Compared with the conventional technology, the technical solutions according to the embodiments of the present disclosure have the following advantages.

According to the embodiments of the present disclosure, a video theme configured by a user and a video production instruction are acquired, a user image and multiple video templates matching the video theme are acquired in response to the video production instruction, the user image is embedded into the reserved positions of at least some video templates among the multiple video templates, to combine the user image with scenario materials in the at least some video templates to generate at least one video. A to-be-posted video among the at least one video is acquired, and the to-be-posted video is posted to a preset video playing platform. According to the solutions in the embodiment of the present disclosure, for each of video themes, multiple video templates are preset for the video theme. For each of the video templates, a scenario material corresponding to the video template is preset and a position for embedding the user image is reserved in the video template. In this way, as long as the user image is embedded in the multiple video templates once during the video generation, at least one video may be generated once, eliminating a reshoot of the user, simplifying operations of the user, and improving the efficiency of the video generation and the user experience. Further, the preset scenario materials may help the user better express theme content (such as a user's emoji), improve the quality and the interest of the video, reduce the requirement for capture ability of the user, help the user better express a theme desired by the user, and improve the enthusiasm of the user for video production. In addition, the improvement in the quality of the video may enhance the viewing experience for consumers of the video.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly illustrate technical solutions in embodiments of the present disclosure or in the conventional technology, the drawings to be used in the description of the embodiments or the conventional technology are briefly described below. Apparently, those skilled in the art may obtain other drawings according to the provided drawings without any creative work.

DETAILED DESCRIPTION OF EMBODIMENTS

In order to make the purposes, features, and advantage of the present disclosure more apparent and easy to understand, the solutions of the present disclosure are further described hereinafter. It should be noted that the embodiments of the present disclosure and the features in the embodiments may be combined with each other if there is no conflict.

In the following detailed description, numerous specific details are set forth in order to provide thorough understanding of the present disclosure. The present disclosure may also be implemented in other ways different from those described here. Apparently, the embodiments in the specification are only a part of the embodiments of the present disclosure, rather than all the embodiments.

Figure 1:
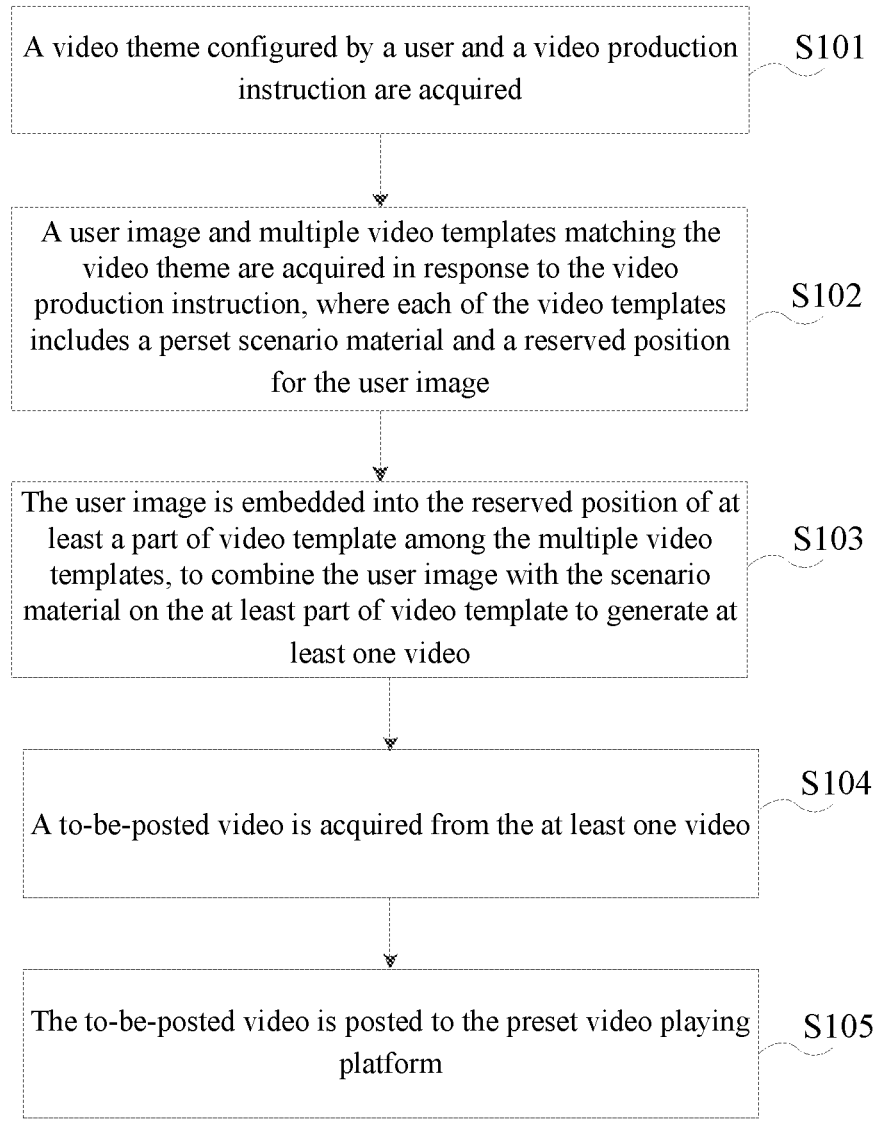
FIG. 1 is a flow chart of a method for generating a video according to an embodiment of the present disclosure.

FIG. 1 is a flow chart of a method for generating a video according to an embodiment of the present disclosure. The method according to the embodiment of the present disclosure may be applicable to a convenient generation of a video required by a user based on a user image. The method for generating the video may be performed by an apparatus for generating a video. The apparatus may be implemented in software and/or hardware, and may be integrated on any terminal device, such as a mobile terminal, or a tablet. Moreover, the apparatus for generating the video may be implemented as an independent application program, or as a functional module integrated in a video interaction application.

As shown in FIG. 1, a method for generating a video according to an embodiment of the present disclosure may include the following steps S101 and S105.

In step S101, a video theme configured by a user and a video production instruction are acquired.

In an embodiment, the video production instruction is used to instruct a terminal device to generate a video required by a user. A video interaction application is taken as an example. A preset interface in the video interaction application includes a control or button for triggering the video production instruction. The user may trigger the video production instruction by touching the control or button. On the basis of ensuring high application interactivity and providing a good user experience for the user, the preset interface may be any interface in the video interaction application, such as a main interface or a user information interface in the video interaction application. A position where the control or the button is displayed on the preset interface may be determined according to design requirements.

The video theme according to the embodiment of the present disclosure is used to classify video templates or classify to-be-generated videos. For example, a type of video theme may include user's emoji (referring to a status presented by a user in a virtual social space) series, love series, office series, and the like. For different types of video themes, video templates are different. Moreover, for each of types of video themes, the video templates may further be sub-divided based on a subcategory of video themes. For example, subcategories corresponding to the user's emoji may include but are not limited to joy emoji, sadness emoji, anger emoji, jealousy emoji, and the like. Each of the subcategories may correspond to multiple video templates. The user may configure a required video theme before triggering the video production instruction, or trigger the video production instruction before configuring the video theme.

In step S102, a user image and multiple video templates matching the video theme are acquired in response to the video production instruction. Each of the video templates includes a preset scenario material and a reserved position for the user image.

In an embodiment of the present disclosure, the acquired user image may be an image currently captured by the user, or may be an existing image obtained from a user album in response to an image selection operation or an image upload operation of the user, which is not limited in the embodiment of the present disclosure. That is, the technical solutions in the embodiment of the present disclosure are widely applicable to any source of user images. The user image is an image including a face.

An order of acquiring the user image and the video templates is not specifically limited in the embodiment of the present disclosure. Exemplary, the user image may be acquired, after multiple (at least two) video templates that match the video theme configured by the user are acquired. Alternately, the multiple video templates that match the video theme configured by the user may be acquired after the user image is acquired.

Taking the image currently captured by the user as an example, the operation of acquiring the user image includes: outputting a capture interface; and acquiring the user image captured by the user based on the capture interface. The capture interface may be entered by switching from a triggering interface of the video production instruction. Alternatively, the capture interface may be entered by switching from a display interface of the video template. In addition, prompt information for guiding the user into the capture interface may be displayed on the triggering interface of the video production instruction or the display interface of the video template, to improve interface interactivity and improve the user experience.

Figure 2:
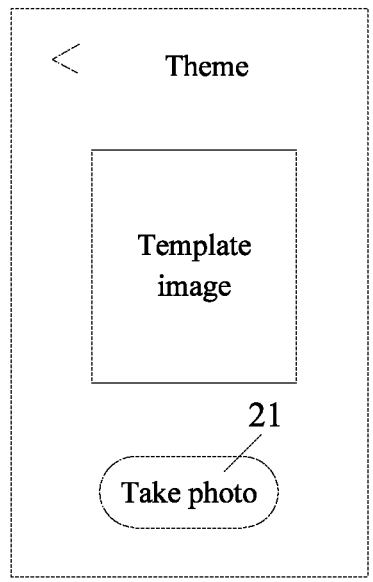
FIG. 2 is a schematic diagram of a display interface of a video template according to an embodiment of the present disclosure.
Figure 3:
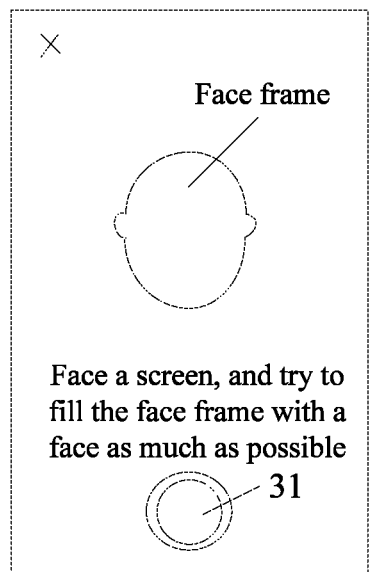
FIG. 3 is a schematic diagram of a capture interface of a user image according to an embodiment of the present disclosure.

FIG. 2 is a schematic diagram of a display interface of a video template according to an embodiment of the present disclosure. FIG. 3 is a schematic diagram of a capture interface of a user image according to an embodiment of the present disclosure. As shown in FIG. 2, prompt information "take photo" for guiding the user into the capture interface is displayed on the display interface. The user may enter the capture interface of the user image as shown in FIG. 3, by touching a button 21. A capture control 31, and prompt information "face a screen, and try to fill a face frame with a face as much as possible" for guiding the user to capture are displayed on the capture interface of the user image as shown in FIG. 3.

In an embodiment, after the user image is acquired, the method according to the embodiment of the present disclosure further includes modifying an expression of the user on the user image using a preset model, to match the expression of the user with the video theme configured by the user. The preset model is a pre-trained model, which is used to modify the expression of the user on the user image. In an embodiment, the process of training the preset model may include: acquiring user image samples and target image samples, where the target image samples are acquired through expression modifying and match the preset video theme; training a model by using the user image samples as an input of the trained model and using the target image samples as an output of the trained model, to obtain the preset model. Algorithms in the process of training the preset model are not specifically limited in the embodiment of the present disclosure, and may be determined according to the requirements of the training.

In an embodiment of the present disclosure, the expression of the user on the user image is modified using the preset model, so that the display effect of the expression of the user may be optimized. Thus, it is ensured that the generated video matches the video theme configured by the user. In addition, the requirement for capture ability of the user may be reduced, and it is not required to replace the user image even if the expression of the user on the user image does not match the video theme, achieving an intelligent modification on the user image.

In step S103, the user image is embedded into the reserved position of at least a part of video template among the multiple video templates, to combine the user image with the scenario material on the at least part of video template to generate at least one video.

In a process of embedding the user image into the reserved positions of the multiple video templates, the user image may be embedded into the reserved positions of the respective video templates according to a preset strategy, or the user image may be embedded into the reserved positions of a part of video templates according to a preset strategy. The preset strategy may include but is not limited to: embedding the user image into a reserved position of a video template selected by the user, in response to a selection operation of the user on the video template; or embedding the user image into the reserved positions of the preset number of the video templates based on current performance information of the terminal device. The preset number is determined based on the current performance information of the terminal device. The Higher a current performance of the terminal device, the larger the preset number may be set. Specifically, after the user image is acquired, a facial region on the user image may be recognized in facial recognition technology, and then the facial region is fused with the reserved position of the video template.

In a first example, in the case that the user image is acquired after multiple video templates matching the video theme are acquired, after the multiple video templates that match the video theme configured by the user are acquired, the multiple video templates may be displayed. At least one target template is determined in response to the selection operation of the user on the video templates. Then, the user image is acquired and the acquired user image is embedded into the reserved position of the at least one target template to generate the video required by the user.

In a second example, in the case that multiple video templates that match the video theme configured by the user are acquired after the user image is acquired, after the user image is acquired, the user image may be directly embedded into the reserved positions of the respective video templates, or the user image may be embedded at the reserved positions of a part of the video templates, to generate at least one video. The user may select a required video from the at least one video.

The at least one generated video may be stored locally. Alternatively, the video selected by the user may be stored locally in response to a selection operation of the user on the video.

In step S104, a to-be-posted video is acquired from the at least one video.

Figure 4:
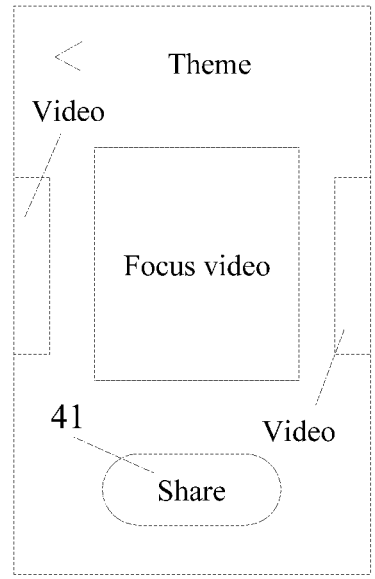
FIG. 4 is a schematic diagram of a first display interface according to an embodiment of the present disclosure.

The to-be-posted video in the embodiment may be understood as a video selected by the user from the at least one generated video. Alternatively, the to-be-posted video may be understood as a video generated based on the video template selected by the user from the multiple acquired video templates. For example, in an embodiment, after the multiple video templates are acquired, the multiple video templates are displayed to the user. The user selects at least one video template from the multiple video templates as the target template. Based on the above step, the user may continue to select one or more templates from selected target templates. The user image is embedded into the one or more templates to generate a video, and the video is determined as the to-be-posted video. Alternatively, after the user selects at least one video template from the multiple video templates matching the video theme as the target template, the acquired user image is first embedded into the target template to generate at least one video, and then the generated at least one video is displayed to the user. The user selects a to-be-posted video from the generated at least one video. For example, in an embodiment, the video generated based on the target template may be displayed on a preset first display interface. The user may select the to-be-posted video on the first display interface. The first display interface may include a first button configured to trigger a video posting instruction by the user. A position of the first button on the first display interface may be determined based on an interface layout. When the first button is triggered, the video selected by the user is posted to a preset video playing platform. For example, FIG. 4 is a schematic diagram of a first display interface according to an embodiment of the present disclosure. As shown in FIG. 4, the first display interface may display the generated video in a form of a list and support the user to switch a currently displayed video on the interface by sliding left or right. If the currently displayed video is a focus video (that is, the selected video), the user may trigger a posting operation of the focus video by touching the first button 41. That is, in the embodiment, the to-be-posted video may be the video selected by the user from the video generated based on the target template, or may be the video generated based on the template selected by the user from the target template.

In step S105, the to-be-posted video is posted to the preset video playing platform.

According to the solutions in the embodiment of the present disclosure, for each of video themes, multiple video templates are preset for the video theme. In each of the video templates, a scenario material corresponding to the video template are preset and a position for embedding the user image is reserved (that is, facial information of the user is fused with the video template). In this way, as long as the user image is embedded in the multiple video templates once in the video generation process, at least one video may be generated, eliminating a reshoot of the user, simplifying operations of the user. Thus, the problem that the user is required to repeatedly capture images when at least one video is generated for the user according to the conventional solutions is solved, thus improving the efficiency of the video generation and improving the user experience. Further, the preset scenario material may help the user better express theme content, improve the quality and the interest of the video, reduce the requirement for capture ability of the user, and help the user better express a theme desired by the user. Even if the capture quality of the user image is poor, a high-quality video may be generated for the user based on the video templates, improving the enthusiasm of the user for video production and solving the problem that the capture quality of the user image directly affects the quality of the generated videos according to the conventional solutions. In addition, the improvement in the quality of the video may enhance the viewing experience for consumers of the video.

In an embodiment, the method according to the embodiment of the present disclosure further includes: displaying, by a third display interface, a video on the preset video playing platform to the user. The video is generated in the method as shown in FIG. 1 described above.

In an embodiment of the present disclosure, the third display interface may include a first icon. When a preset touch operation of the user on the first icon of the third display interface is detected, an interactive interface for interacting with a video poster is provided for the user.

Interactive information is generated in response to an operation on a preset option detected on the interactive interface, and the interactive information is sent to the video poster.

The preset option detected on the interactive interface may include at least one of the following options: an option for sending a message, a greeting option, and an option for viewing a video posting record. Operations triggered though the options may include but are not limited to, such as sending a message to the video poster, greeting with the video poster, and viewing the video posting record of the video poster (such as videos for expressing historical emojis of the user). The interactive interface may be displayed on the third display interface in an overlapping manner. Alternatively, the interactive interface may be a new interface which is entered by switching from the third display interface. Alternatively, the interactive interface may be displayed on a new interface in the overlapping manner, after the new interface is entered by switching from the third display interface. The new interface may be a user information interface of the video poster, and the first icon may be a user avatar icon of the video poster. In response to a touch operation of a current user on the first icon, the display of the interactive interface may be triggered, and the user may further follow the video poster if the video poster is not a following target of the user. A display position of the first icon on the third display interface may be determined based on the page design, and a shape of the first icon may be flexibly determined.

The interactive interface supports the touch operation or an information input operation of the user. The interactive information is generated based on the touch operation or the information input operation of the user. For example, preset interactive statements may be displayed on the interactive interface. In response to a selection operation of the user on the interactive statements, a statement selected by the user serves as interactive information to be sent to the video poster. The interactive information is automatically sent to the video poster after the interactive information is generated. Alternatively, the interactive information may be sent on receipt of a sending instruction triggered by the user. For example, a confirm button and a cancel button may be displayed on the interactive interface. The confirm button is used for the user to trigger the sending instruction, and the cancel button is used for the user to trigger a canceling sending instruction. According to an embodiment of the present disclosure, flexible interaction between the user and the video poster may be achieved by switching from the third display interface for playing a video to the interactive interface, thus enriching the interaction manners of users and making the interaction manners more flexible.

Figure 5:
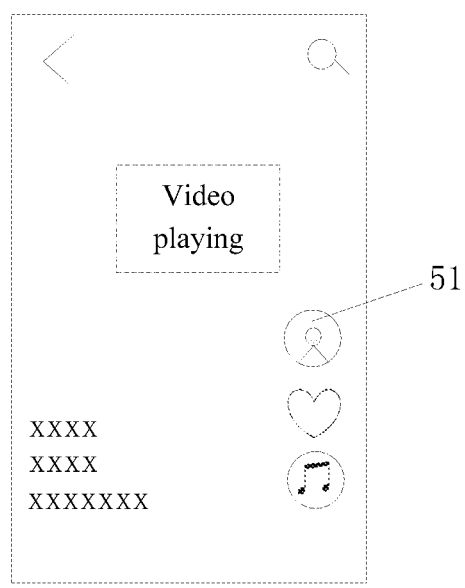
FIG. 5 is a schematic diagram of a third display interface according to an embodiment of the present disclosure.
Figure 6:
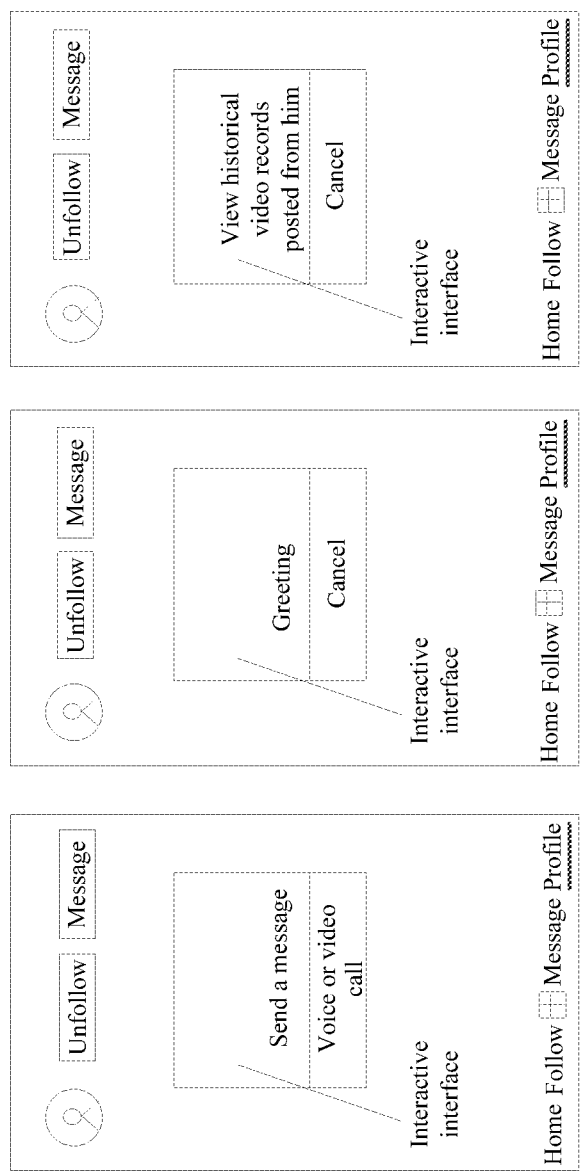
FIG. 6 is a schematic diagram of an interactive interface according to an embodiment of the present disclosure.

FIG. 5 is a schematic diagram of a third display interface according to an embodiment of the present disclosure. The third display interface is a video playing interface. A first icon 51 is displayed on the third display interface. In response to a touch operation of the user on the first icon 51, the terminal device may display the interactive interface. FIG. 6 is a schematic diagram of an interactive interface according to an embodiment of the present disclosure. Specifically, the interactive interface may be displayed on the user information interface of the video poster in the overlapping manner after the user information interface of the video poster is entered by switching from the third display interface. As shown in FIG. 6, the interactive interface supports sending a message, greeting, and viewing the historical video posting record of the peer. It should be noted that each type of interaction function supported on the interaction interface is implemented in an independent interaction interface as shown in FIG. 6. It should be understood that multiple interaction functions supported on the interaction interface may be displayed in an integrated manner. In addition, the interactive interface may further display other information, such as a video theme currently configured by the user, an emoji currently configured by the user, and an account name of the user. The information displayed on the interactive interface may be adjusted according to the interface design, which will not be limited in the embodiments of the present disclosure.

Figure 7:
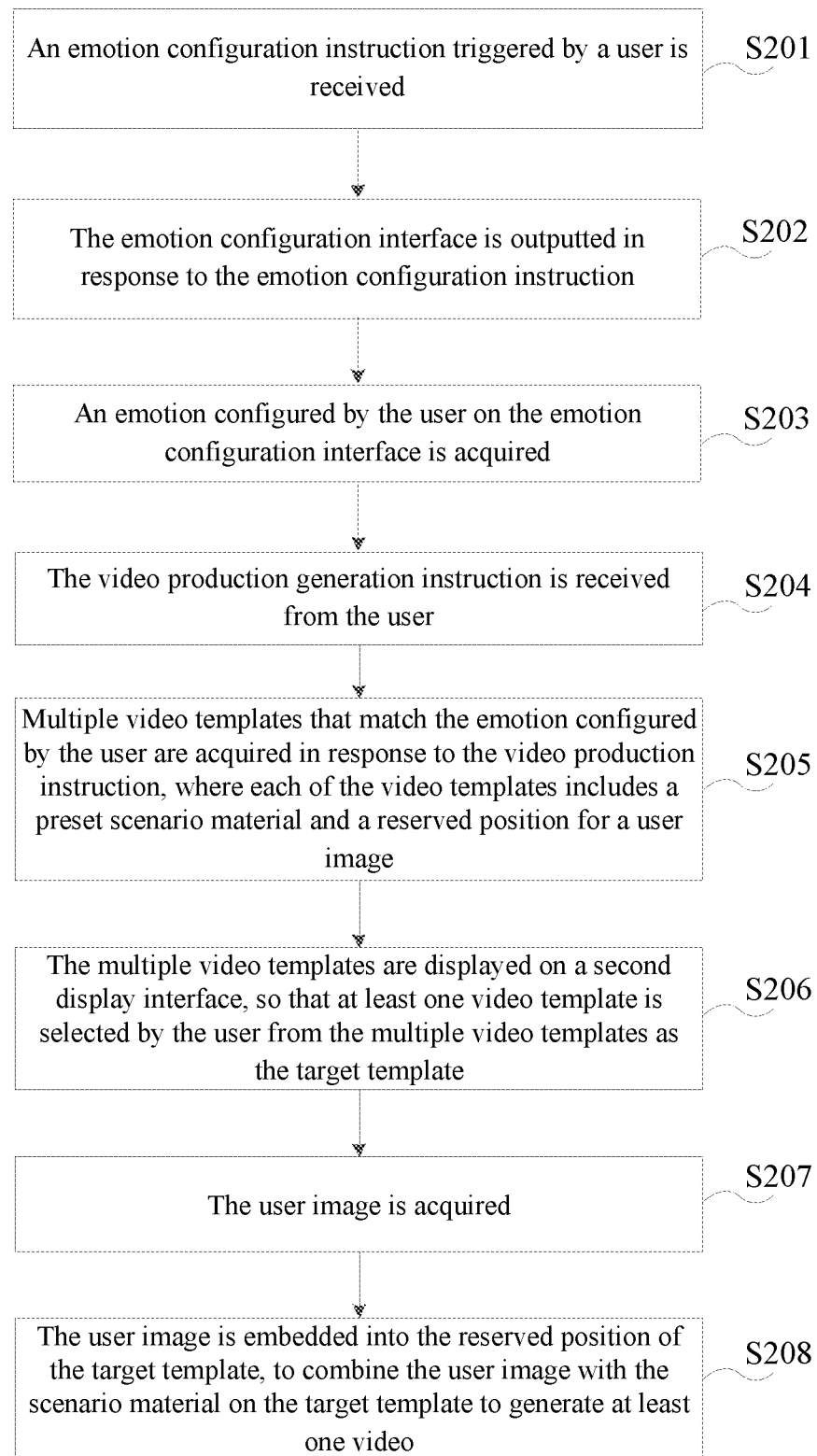
FIG. 7 is a flow chart of a method for generating a video according to another embodiment of the present disclosure.

FIG. 7 is a flow chart of a method for generating a video according to another embodiment of the present disclosure. The method for generating the video is acquired by further optimizing and expanding the above technical solutions, and may be combined with the above embodiments. In addition, the technical solutions in the embodiment of the present disclosure are described with an example that the video theme is an emoji configured by the user, as shown in FIG. 7.

As shown in FIG. 7, the method for generating the video according to an embodiment of the present disclosure includes the following steps S201 to S208.

In step S201, an emoji configuration instruction triggered by a user is received.

For example, the user may trigger the emoji configuration instruction through an emoji configuration button on the user information interface in the video interaction application. The emoji configuration instruction may be used to instruct the terminal device to display an emoji configuration interface.

In step S202, the emoji configuration interface is outputted in response to the emoji configuration instruction.

The emoji configuration interface includes an emoji sharing button. In response to a touch operation of the user on the button, a video production instruction is received from the user.

Figure 8:
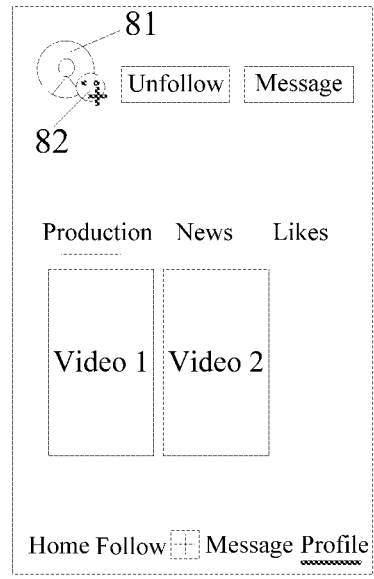
FIG. 8 is a schematic diagram of a user information interface on which an emoji configuration button is displayed according to an embodiment of the present disclosure.

FIG. 8 is a schematic diagram of a user information interface on which an emoji configuration button is displayed according to an embodiment of the present disclosure. As shown in FIG. 8, an emoji configuration button 82 is displayed at a lower right corner of a user icon 81. In response to a touch operation of the user on the emoji configuration button 82, the terminal device displays the emoji configuration interface. The emoji configuration interface may include one interface. The user may select a current emoji from emoji icons displayed on the interface, and trigger the video production instruction by touching the emoji sharing button. The emotion configuration interface may include an emoji selection sub-interface (displaying multiple emojis icons) and an emoji configuration display sub-interface. The emotion sharing button may be displayed on the emoji configuration display sub-interface. In such case, in response to a touch operation of the user on the emoji configuration button 82, the terminal device first displays the emoji selection sub-interface. When it is detected that the user has been completed a selection operation, the emoji selection sub-interface is switched to the emoji configuration display sub-interface. The emoji configuration interface may be displayed on the user information interface in an overlapping manner. Alternatively, the emoji configuration interface may be a new interface switched from the user information interface.

Figure 9:
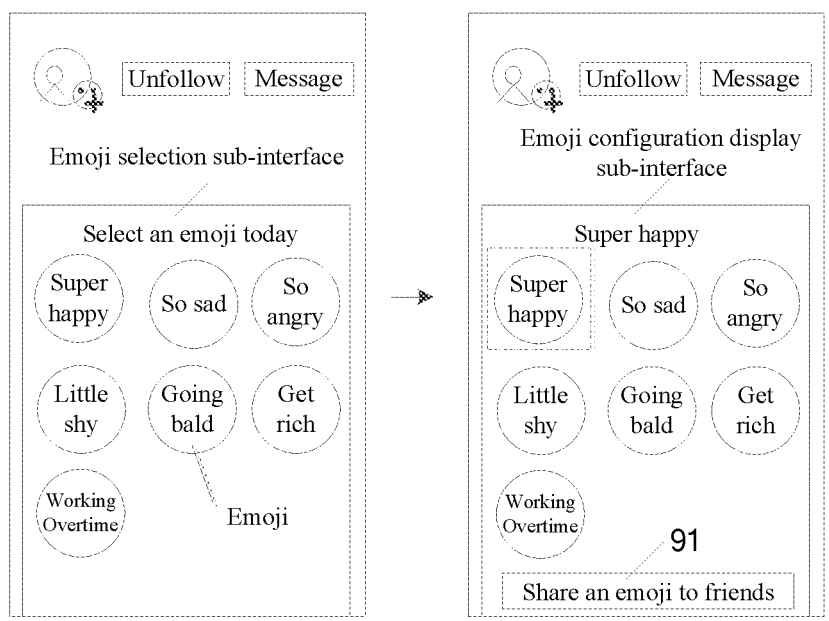
FIG. 9 is a schematic diagram of an emoji configuration interface according to an embodiment of the present disclosure.

FIG. 9 is a schematic diagram of an emoji configuration interface according to an embodiment of the present disclosure. The emoji configuration interface is displayed on the user information interface in the overlapping manner. The emoji configuration interface includes the emoji selection sub-interface and the emoji configuration display sub-interface. A button 91 for sharing the emoji is displayed on the emoji configuration display sub-interface. The user selects a current emotion on the emoji selection sub-interface, for example, the user selects super happy emoji as the current emoji. In response to the selection operation of the user on the emojis, the terminal device may automatically display the emoji configuration display sub-interface. The user may trigger the video production instruction by touching the button 91. An interface layout, styles of emojis, and the number of displayed emojis on the emoji configuration interface shown in FIG. 9 are only exemplary, which may be flexibly designed according to the requirements in the actual applications, and will not be limited in the embodiment of the present disclosure. Moreover, the user icon and prompt information indicating a successful configuration of the emoji may be displayed on the emoji configuration interface, specifically, on the emoji configuration display sub-interface.

In step S203, an emoji configured by the user on the emoji configuration interface is acquired.

In step S204, the video production instruction is received from the user.

The video production instruction is triggered in response to a touch operation of the user on the emoji sharing button on the emoji configuration interface.

In step S205, multiple video templates that match the emoji configured by the user are acquired in response to the video production instruction, where each of the video templates includes a preset scenario material and a reserved position for a user image.

In step S206, the multiple video templates are displayed on a second display interface, so that at least one video template is selected by the user from the multiple video templates as the target template.

In step S207, the user image is acquired.

The second display interface includes a third button. The user image is acquired in response to a triggering operation of the user on the third button. In an embodiment, the second display interface further includes prompt information for guiding the user to trigger the third button to enter a capture interface.

For example, a schematic diagram of the second display interface may refer to FIG. 2. The terminal device determines at least one target template in response to a selection operation of the user on the second display interface; displays the capture interface in response to a touch operation of the user on the third button (such as the button 21 of "take photo" shown in FIG. 2) on the second display interface, and then acquires the user image captured by the user on the capture interface.

In step S208, the user image is embedded into the reserved position of the target template, to combine the user image with the scenario material on the target template to generate at least one video.

In an embodiment, the operation of embedding the user image into the reserved position of at least a part of video templates among the multiple video templates includes: replacing a preset image on the target template with the user image, where the preset image includes a facial region of a sample user preset in the process of generating the video template, such as a cartoon character image. A facial region on the user image is recognized in the facial recognition technology. The facial region on the preset image on the target template is replaced with the facial region on the user image, to generate at least one video. The preset image on the target template is replaced with the user image, improving the convenience of generating multiple videos using the user image once.

After at least one video is generated, the terminal device may post a focus video selected by the user to the preset video playing platform in response to a selection operation of the user on the at least one video.

According to technical solutions of an embodiment of the present disclosure, the emoji configuration interface is displayed in response to the emoji configuration instruction from the user, the emoji configured by the user on the emoji configuration interface is acquired, multiple video templates that match the emoji configured by the user are acquired on receipt of the video production instruction from the user, and the multiple video templates are displayed. Then, at least one target template is determined in response to the selection operation of the user on the video templates, and the user image is embedded into the at least one target template, to generate at least one video for presenting the emoji of the user. Therefore, as long as the user image is embedded in the at least one target template once in the video generation process, at least one video is generated. Thus, the user is not required to repeatedly capture images if different videos are generated, simplifying operations of the user and improving user experience. In addition, the preset scenario material in the video template may help the user better present the current emoji, improve the quality and the interest of the video, and reduce the requirement for capture ability of the user. Even if the capture quality of the user image is poor, a high-quality video may be generated for the user based on the video templates, improving the enthusiasm of the user for video production. In addition, the improvement in the quality of the video may enhance the viewing experience for consumers of the video.

Based on the above technical solutions, in an embodiment, after the video production instruction is received from a user, the method according to an embodiment of the present disclosure further includes: determining whether the number of times the user shares an emoji within a preset time period is greater than a preset threshold; outputting prompt information indicating that the emoji cannot be shared currently, in the case that the number of times the user shares the emoji within the preset time period is greater than the preset threshold; and acquiring the user image and the multiple video templates that match the video theme configured by the user in response to the video production instruction, in the case that the number of times the user shares the emoji within the preset time period is less than or equal to the preset threshold.

The preset threshold is set based on the preset time period. A long preset time period indicates that the preset threshold may be large. For example, the preset time period is 24 hours and the preset threshold may be 1, which indicates that the user may only share an emoji once a day. The resource consumption on the video playing platform can be reduced by effectively controlling the number of times the user shares the emoji within the preset time period, avoiding the deterioration of the functions of the platform caused by the video playing platform receiving too many emoji sharing requests within the preset time period, improving the responsiveness of the video playing platform to other requests, thus improving the video sharing experience of the user.

Figure 10:
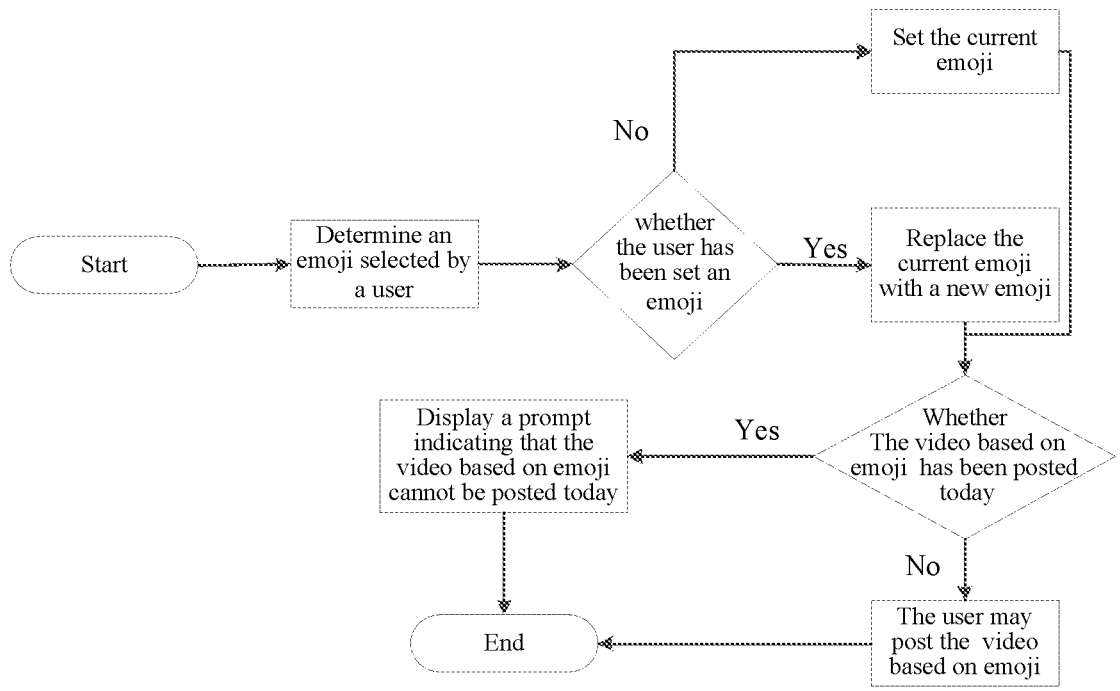
FIG. 10 is a flow chart of setting an emoji according to an embodiment of the present disclosure.

FIG. 10 is a flow chart of setting an emoji according to an embodiment of the present disclosure, which is used to exemplarily illustrate the embodiment of the present disclosure, and should not be understood as a specific limitation to the embodiment of the present disclosure. As shown in FIG. 10, a process of setting an emoji may include as follows. The terminal device determines an emoji selected by the user. In response to a selection operation by the user on the emoji on the emoji configuration interface. The terminal device detected whether a current emoji has been set by the use. In the case that the current emotion has not been set by the use, the terminal device determines the emoji selected by the user as the current emoji. In the case that the current emoji has been set by the use, the terminal device replaces the current emoji with a new emoji currently selected by the user. The terminal device detects whether the user has posted a video based on emoji today in response to the video production instruction from the user. If the user has posted the video based on emoji today, the terminal device displays a prompt indicating that the video based on emoji cannot be posted today; and else, the user can post the video based on emoji. That is, the terminal device may acquire multiple video templates that match the emoji configured by the user in response to the video production instruction, and display the acquired multiple video templates, so that the user can select at least one target template from the multiple video templates. When the target template includes a historical image (that is, a user image embedded into the target template in the past) of the user, a video of a template selected by the user from the target template is posted to the preset video playing platform in response to a posting instruction from the user, and the current video production process ends. The user image is acquired in response to a capture instruction from the user, and the video is generated by replacing the historical image on the target template with the acquired user image. When the target template does not include the historical image of the user, the user image is directly captured in response to the capture instruction from the user, and the captured user image is embedded into the reserved position of the target template to generate the video.

According to the embodiment, video templates including the historical image of the user are displayed to the user. When the user selects a video template including the historical image for posting, the historical image may be combined with the video template directly to generate the video, and then generated video may be posted to the preset video playing platform, improving the posting efficiency of the video.

Figure 11:
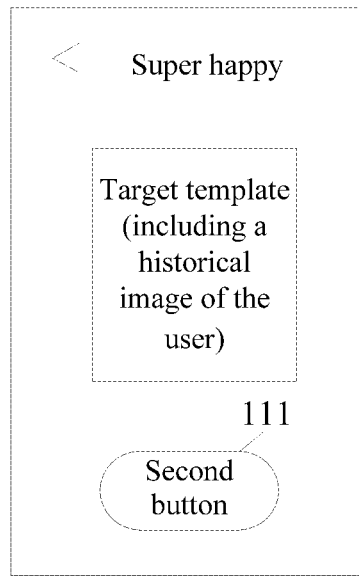
FIG. 11 is a schematic diagram of a second display interface according to an embodiment of the present disclosure.

FIG. 11 is a schematic diagram of a second display interface according to an embodiment of the present disclosure. As shown in FIG. 11, an emoji of "super happy" configured by the user is taken as an example. A currently displayed video template is a target template which includes the historical image of the user and is selected by the user. A posting operation on the video based on the target template is triggered in response to a touch operation of the user on a second button 111 on the second display interface. That is, if the user creates a historical video using the current target template during the historical video production process, the historical video based on the current target template may directly serve as the current video when the user selects the current target template again. Taking the emoji theme as an example, a historical video for expressing a historical emoji of the user may serve as a video for expressing a current emoji of the user (that is, the current emoji is the same as the historical emoji), and the historical video is posted to the video playing platform, so as to improve the sharing efficiency of the user for the video.

Figure 12:
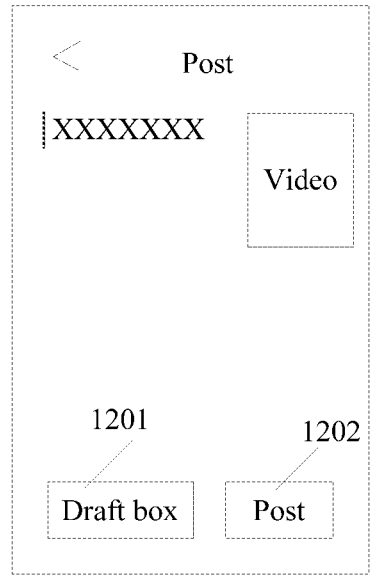
FIG. 12 is a schematic diagram of a video posting interface according to an embodiment of the present disclosure.

FIG. 12 is a schematic diagram of a video posting interface according to an embodiment of the present disclosure. The posting operation on the video based on the target template is triggered in response to the touch operation of the user on the second button on the second display interface. In this case, the terminal device may display a video posting interface, as shown in FIG. 12. The user may touch a posting button 1202 to post the to-be-posted video to the video playing platform after editing posted information. In addition, the video posting interface may further include a draft box button 1201. The to-be-posted video may be stored in a draft box in response to a touch operation of the user on the draft box button 1201. Next time a video is posted, the video stored in the draft box may be directly posted, or the video in the draft box is edited for posting, which can help improve the sharing efficiency for the video.

Figure 13:
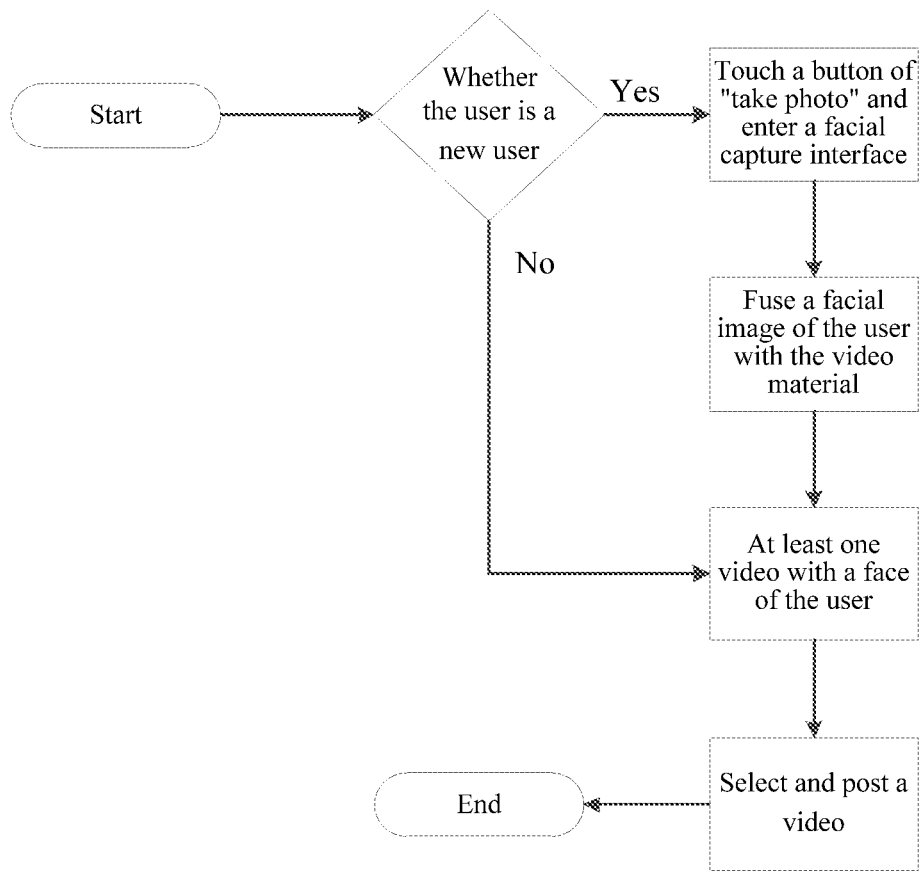
FIG. 13 is a flow chart of a method for generating a video according to another embodiment of the present disclosure.

FIG. 13 is a flow chart of a method for generating a video according to another embodiment of the present disclosure, which is used to exemplarily illustrate the embodiment of the present disclosure, and should not be understood as a specific limitation to the embodiment of the present disclosure. As shown in FIG. 13, the method for generating the video may include as follows. After it is determined that the video posting operation may be performed by the user and multiple video templates that match the emoji configured by the user are acquired, the terminal device determines whether the user is a new user. The new user has not created an exclusive video by embedding a facial image into any video template before a current time instant. If the user is the new user, the user enters a facial capture interface (that is, the capture interface of the user image as described above) in response to a touch operation of the user on the button of "take photo" on the display interface of the video template, and the facial image of the user captured on the facial capture interface is acquired. Then, the facial image of the user is fused with multiple video materials (that is, video templates) to obtain at least one video with the face of the user. Finally, a to-be-posted video is determined and posted in response to a selection operation of the user on at least one generated video. If the user is not the new user, that is, the user has created a video with a facial image of the user before the current time instant, a video based on a video template which has been fused with the facial image and is selected by the user may be directly posted to the preset video playing platform in response to the posting instruction of the user. In the case that the video with the facial image of the user has been generated before the current time instant and the capture instruction is triggered by the user, the user still enters the facial capture interface, and the facial image of the user is fused with multiple video materials (that is, video templates) to obtain at least one video with the face of the user.

Figure 14:
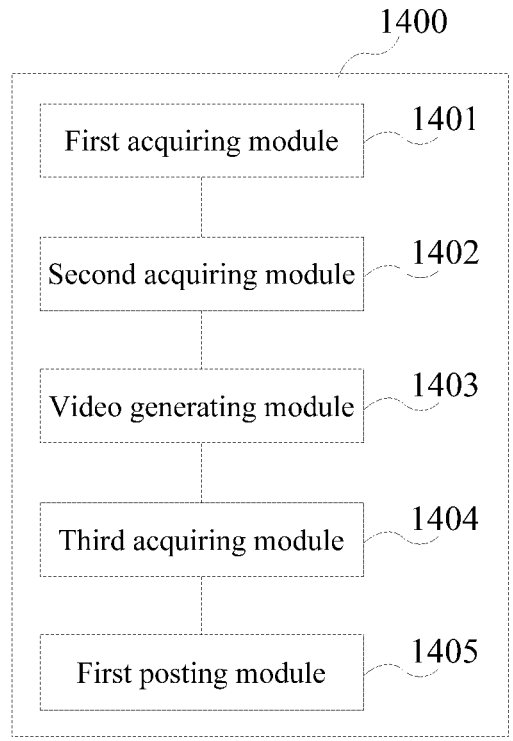
FIG. 14 is a schematic structural diagram of an apparatus for generating a video according to an embodiment of the present disclosure.

FIG. 14 is a schematic structural diagram of an apparatus 1400 for generating a video according to an embodiment of the present disclosure. The apparatus may be implemented in software and/or hardware, and may be integrated on any terminal device.

As shown in FIG. 14, the apparatus 1400 for generating the video according to the embodiment of the present disclosure may include a first acquiring module 1401, a second acquiring module 1402, a video generating module 1403, a third acquiring module 1404 and a first posting module 1405.

The first acquiring module 1401 is configured to acquire a video theme configured by a user and a video production instruction.

The second acquiring module 1402 is configured to acquire a user image and multiple video templates matching the video theme, in response to the video production instruction, where each of the multiple video templates includes a preset scenario materials and a reserved position for the user image.

The video generating module 1403 is configured to embed the user image into the reserved position of at least a part of video template among the multiple video templates, where the user image is combined with scenario material on the at least part of video template to generate at least one video.

The third acquiring module 1404 is configured to acquire a to-be-posted video among the at least one video.

The first posting module 1405 is configured to post the to-be-posted video to a preset video playing platform.

In an embodiment, the to-be-posted video includes: a video selected by the user from the at least one video, or a video generated based on a video template selected by the user from the multiple video templates.

In an embodiment, the video theme includes: an emoji configured by the user on an emoji configuration interface.

In an embodiment, the apparatus 1400 for generating the video according to the embodiment of the present disclosure further includes a module for determining the number of times of sharing the emoji and a module for outputting prompt information.

The module for determining the number of times of sharing the emoji is configured to determine whether the number of times the user shares the emoji within a preset time period is greater than a preset threshold.

The module for outputting prompt information is configured to output prompt information indicating that the number of times the user shares the emoji is greater than the threshold, in a case that the number of times the user shares an emoji within the preset time period is greater than the preset threshold.

The first acquiring module 1402 is further configured to acquire the user image and the multiple video templates matching the video theme in response to the video production instruction, in a case that the number of times the user shares the emoji within the preset time period is less than or equal to the preset threshold.

In an embodiment, the first acquiring module 1402 is further configured to acquire the user image after the multiple video templates matching the video theme are acquired.

In an embodiment, the apparatus 1400 for generating the video according to the embodiment of the present disclosure further includes a second display module and a second posting module.

The second display module is configured to display the multiple video templates to the user, so that at least one video template is selected by the user from the multiple video templates as a target template.

The second posting module is configured to post a video of a template selected by the user from the target template to the preset video playing platform, in a case that the reserved position of the target template comprises a historical image of the user and a posting instruction is received from the user, and end a current process of generating the video.

The video generating module is further configured to acquire the user image in response to a capture instruction of the user, and replace the historical image on the target template with the user image in a process of embedding the user image into the reserved position of the at least part of video template among the multiple video templates.

In an embodiment, the apparatus 1400 for generating the video according to the embodiment of the present disclosure further includes: an expression modifying module configured to modify an expression of the user on the user image using a preset model, to match the expression of the user with the video theme.

In an embodiment, the apparatus 1400 for generating the video according to the embodiment of the present disclosure further includes a video playing module, an interactive interface display module, and an interactive information sending module.

The video playing module is configured to play, on a display interface, a video on the video playing platform, where the video on the video playing platform is generated based on the video template.

The interactive interface display module is configured to provide an interactive interface for interacting with a video poster, in response to detecting a preset touch operation on the display interface.

The interactive information sending module is configured to generate interactive information, in response to an operation of the user on options on the interactive interface; and send the interactive information to the video poster, where the options include at least one of an option of sending a message, a greeting operation, and an option of viewing a video posting record.

The apparatus for generating the video according to the embodiments of the present disclosure may perform the method for generating the video according to any embodiment of the present disclosure, and has corresponding functional modules and beneficial effects for performing the method. For contents not described in detail in the embodiments of the apparatus, reference may be made to the description in the method according to any embodiment of the present disclosure.

Figure 15:
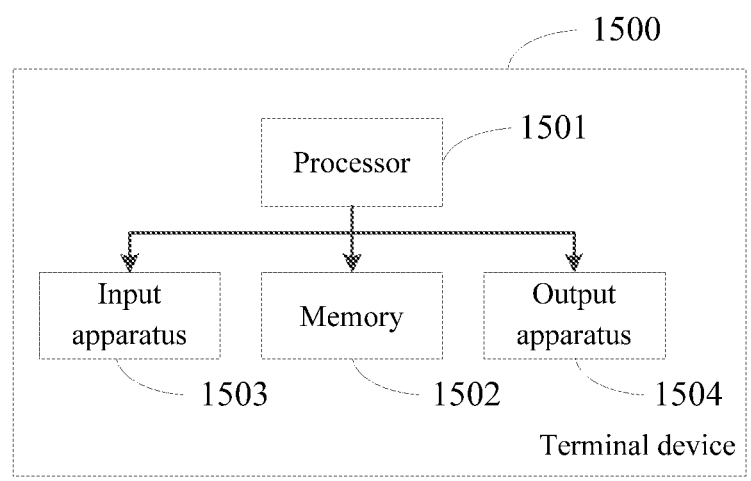
FIG. 15 is a schematic structural diagram of a terminal device according to an embodiment of the present disclosure.

FIG. 15 is a schematic structural diagram of a terminal device according to an embodiment of the present disclosure. As shown in FIG. 15, the terminal device 1500 includes one or more processors 1501 and a memory 1502.

The processors 1501 may be a central processing unit (CPU) or other form of processing unit be capable of processing data and/or executing instructions, and may control other components in the terminal device 1500 to perform expected functions.

The memory 1502 may include one or more computer program products. The computer program products may include various forms of computer-readable storage media, such as a volatile memory and/or non-volatile memory. The volatile memory may include, for example, a random-access memory (RAM) and/or high-speed cache memory. The non-volatile memory may include, for example, a read-only memory (ROM), a hard disk, a flash memory, and the like. The computer-readable storage medium may store one or more computer program instructions. The processor 1501 may execute the program instructions to perform the method for generating a video according to any embodiment of the present disclosure, as well as other expected functions. The computer-readable storage medium may store various contents such as input signals, signal components, noise components, and the like.

In an embodiment, the terminal device 1500 may further include an input apparatus 1503 and an output apparatus 1504. These components in the terminal device 1500 are interconnected through a bus system and/or other forms of connection mechanisms (not shown).

In addition, the input apparatus 1503 may include, for example, a keyboard and a mouse.

The output apparatus 1504 may output various information to the outside, including determined distance information, direction information, and the like. The output apparatus 1504 may include, for example, a display, a speaker, a printer, a communication network, and a remote output device connected to the display, the speaker, the printer and the communication network.

For simplicity, only some of components in the terminal device 1500 related to the present disclosure are shown in FIG. 15, and components such as buses, input/output interfaces are omitted. In addition, the terminal device 1500 may further include any other appropriate components according to the specific application situation.

In addition to the method and the apparatus described above, a computer program product is further provided according to an embodiment of the present disclosure. The computer program product includes computer program instructions. The computer program instructions, when executed by a processor, cause the processor to perform the method for generating a video according to any embodiment of the present disclosure.

The computer program codes for performing operations of the embodiments of the present disclosure may be written in the computer program product using one program design language or any combination of multiple program design languages. The program design languages include an object-oriented program design language such as Java, and C++, and further include conventional process-type program design language such as "C" language or similar program design language. The program codes may be executed entirely on a user terminal device, executed partially on the user terminal device, executed as an independent software package, executed partially on the user terminal device and partially on a remote terminal device, or executed entirely on the remote terminal device or a server.

In addition, a computer-readable storage medium is further provided according to an embodiment of the present disclosure. The computer-readable storage medium stores computer program instructions. The computer program instructions, when executed by a processor, cause the processor to perform the method for generating a video according to any embodiment of the present disclosure.

The computer-readable storage medium may adopt any combination of one or more computer-readable storage media. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or component, or any combination of the above. More specific examples (non-exhaustive list) of the computer-readable storage medium include: an electrical connection having one or more wires, a portable disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device or any combination of the above.

It should be noted that the terms "first", "second" and the like in the description are used for distinguishing an entity or operation from another entity or operation, rather than requiring or implying an actual relationship or order between these entities or operations. In addition, terms of "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, an element defined by a statement of "comprising (including) one . . . " does not exclude a case that other similar elements exist in the process, method, article or device including the element.

The above are only specific implementations of the present disclosure, so that those skilled in the art can understand or implement the present disclosure. It is apparent for those skilled in the art to make many modifications to these embodiments. The general principle defined herein may be applied to other embodiments without departing from spirit or scope of the present disclosure. Therefore, the present disclosure is not limited to the embodiments illustrated herein, but should be defined by the broadest scope consistent with the principle and novel features disclosed herein.

The invention claimed is:

1. A method for generating a video, comprising:
acquiring a video theme configured by a user and a video production instruction;

acquiring a user image and at least one video template matching the video theme in response to the video production instruction, wherein the video template comprises a preset target material and a reserved position for the user image;

embedding the user image into the reserved position of the at least one video template, to combine the user image with the target material on the at least video template;

acquiring a to-be-posted video; and posting the to-be-posted video to a preset video playing platform, wherein the video theme comprises a status configured by the user on a status configuration interface, wherein after the acquiring a video theme configured by a user and a video production instruction, the method further comprises:

determining whether the number of times the user shares the status within a preset time period is greater than a preset threshold;

outputting target information indicating that the number of times the user shares the status is greater than the preset threshold, in response to the number of times the user shares the status within the preset time period greater than the preset threshold; and acquiring the user image and the at least one video template matching the video theme in response to the video production instruction, in response to the number of times the user shares the status within the preset time period less than or equal to the preset threshold.

2. The method according to claim 1, wherein the to-be-posted video comprises:

a video selected by the user from the plurality of generated videos, or a video generated based on a video template selected by the user from the plurality of video templates.

3. The method according to claim 1, wherein the acquiring a user image and a plurality of video templates matching the video theme in response to the video production instruction comprises:

acquiring the user image after the plurality of video templates matching the video theme are acquired.

4. The method according to claim 3, wherein after the acquiring the plurality of video templates matching the video theme, the method further comprises:

displaying the plurality of video templates to the user, wherein at least one video template is selected by the user from the plurality of video templates as a target template;

in response to the reserved position of the target template comprising a historical image of the user, posting a video of a template selected by the user from the target template to the preset video playing platform in response to a posting instruction from the user, and ending a current process of generating the video; and acquiring the user image in response to a capture instruction from the user, and replacing the historical image on the target template with the user image in a process of embedding the user image into the reserved position of the at least part of video template among the plurality of video templates.

5. The method according to claim 1, further comprising:

playing, on a display interface, the video on the video playing platform, wherein the video on the video playing platform is generated based on the video template;

providing an interactive interface for interacting with a video poster, in response to detecting a preset trigger operation on the display interface; and generating interactive information in response to an operation on a preset option detected on the interactive interface, and sending the interactive information to the video poster, wherein the preset options comprise at least one of: an operation of sending a message, a greeting operation, and an operation of viewing a video posting record.

6. A terminal device, comprising:

a memory storing a computer program; and a processor, wherein the computer program, when executed by the processor, causes the processor to:

acquire a video theme configured by a user and a video production instruction;

acquire a user image and at least one video template matching the video theme in response to the video production instruction, wherein the video template comprises a preset target material and a reserved position for the user image;

embed the user image into the reserved position of the at least one video template, to combine the user image with the target material on the at least one video template;

acquire a to-be-posted video; and post the to-be-posted video to a preset video playing platform, wherein the video theme comprises a status configured by the user on a status configuration interface, wherein after the video theme configured by the user and the video production instruction are acquired, the computer program, when executed by the processor, causes the processor to:

determine whether the number of times the user shares the status within a preset time period is greater than a preset threshold;

output target information indicating that the number of times the user shares the status is greater than the preset threshold, in response to the number of times the user shares the status within the preset time period greater than the preset threshold; and acquire the user image and the at least one video template matching the video theme in response to the video production instruction, in response to the number of times the user shares the status within the preset time period less than or equal to the preset threshold.

7. The terminal device according to claim 6, wherein the to-be-posted video comprises:

a video selected by the user from the plurality of generated videos, or a video generated based on a video template selected by the user from the plurality of video templates.

8. The terminal device according to claim 6, wherein the computer program, when executed by the processor, causes the processor to:

acquire the user image after the plurality of video templates matching the video theme are acquired.

9. The terminal device according to claim 8, wherein after the plurality of video templates matching the video theme are acquired, the computer program, when executed by the processor, causes the processor to:

display the plurality of video templates to the user, wherein at least one video template is selected by the user from the plurality of video templates as a target template;

in response to the reserved position of the target template comprising a historical image of the user, post a video of a template selected by the user from the target template to the preset video playing platform in response to a posting instruction from the user, and end a current process of generating the video; and acquire the user image in response to a capture instruction from the user, and replace the historical image on the target template with the user image in a process of embedding the user image into the reserved position of the at least part of video template among the plurality of video templates.

10. The terminal device according to claim 6, wherein the computer program, when executed by the processor, causes the processor to:

play, on a display interface, the video on the video playing platform, wherein the video on the video playing platform is generated based on the video template;

provide an interactive interface for interacting with a video poster, in response to detecting a preset trigger operation on the display interface; and generate interactive information in response to an operation on a preset option detected on the interactive interface, and send the interactive information to the video poster, wherein the preset options comprise at least one of: an operation of sending a message, a greeting operation, and an operation of viewing a video posting record.

11. A non-transitory computer-readable storage medium, wherein the computer-readable storage medium stores a computer program; and the computer program, when executed by a processor, causes the processor to:

acquire a video theme configured by a user and a video production instruction;

acquire a user image and at least one video template matching the video theme in response to the video production instruction, wherein the video template comprises a preset target material and a reserved position for the user image;

embed the user image into the reserved position of the at least one video template, to combine the user image with the target material on the at least one video template;

acquire a to-be-posted video; and post the to-be-posted video to a preset video playing platform, wherein the video theme comprises a status configured by the user on a status configuration interface, wherein after the video theme configured by the user and the video production instruction are acquired, the computer program, when executed by the processor, causes the processor to:

determine whether the number of times the user shares the status within a preset time period is greater than a preset threshold;

output target information indicating that the number of times the user shares the status is greater than the preset threshold, in response to the number of times the user shares the status within the preset time period greater than the preset threshold; and acquire the user image and the at least one video template matching the video theme in response to the video production instruction, in response to the number of times the user shares the status within the preset time period less than or equal to the preset threshold.

12. The non-transitory computer-readable storage medium according to claim 11, wherein the to-be-posted video comprises:

a video selected by the user from the plurality of generated videos, or a video generated based on a video template selected by the user from the plurality of video templates.

* * * * *